United States Patent
Kaltenrieder et al.

(10) Patent No.: US 9,004,740 B2
(45) Date of Patent: Apr. 14, 2015

(54) LIGHT GUIDE FOR LIGHTING AN INFORMATION DISPLAY DEVICE

(75) Inventors: Andre Kaltenrieder, Preles (CH); Martin Jufer, Melchnau (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 14/125,482

(22) PCT Filed: May 2, 2012

(86) PCT No.: PCT/EP2012/058007
§ 371 (c)(1),
(2), (4) Date: Dec. 11, 2013

(87) PCT Pub. No.: WO2013/010689
PCT Pub. Date: Jan. 24, 2013

(65) Prior Publication Data
US 2014/0119044 A1   May 1, 2014

(30) Foreign Application Priority Data

Jul. 15, 2011  (EP) .................................... 11005805

(51) Int. Cl.
*F21V 8/00* (2006.01)
*G02F 1/1345* (2006.01)
*G02F 1/1335* (2006.01)

(52) U.S. Cl.
CPC ............ *G02B 6/0096* (2013.01); *G02B 6/0058* (2013.01); *G02B 6/0083* (2013.01); *G02F 1/133615* (2013.01); *G02F 1/13452* (2013.01)

(58) Field of Classification Search
CPC ................ G02B 6/0096; G02B 6/0058; G02F 1/133615
USPC .................................................. 362/634, 559
See application file for complete search history.

(56) References Cited

U.S. PATENT DOCUMENTS

2005/0185389 A1   8/2005   Henriet et al.

FOREIGN PATENT DOCUMENTS

EP         1 566 686 A1   8/2005
GB         2 008 812 A    6/1979

OTHER PUBLICATIONS

International Search Report issued Jul. 10, 2012, in PCT/EP12/058007 filed May 2, 2012.

*Primary Examiner* — Anabel Ton
(74) *Attorney, Agent, or Firm* — Oblon, McClelland, Maier & Neustadt, L.L.P.

(57) ABSTRACT

A lighting system for an information display device, the lighting system including a light guide including at least one area into which the light produced by a light source is injected, the light guide also being used as a guide element for at least one electrical connector for the electrical connection between the information display device and an electronic control circuit of the information display device, wherein the light guide is coated, in the light injection area, with a layer of electrically non-conductive material which absorbs light.

1 Claim, 3 Drawing Sheets

LIGHT GUIDE FOR LIGHTING AN INFORMATION DISPLAY DEVICE

CROSS-REFERENCE TO RELATED APPLICATIONS

This is a National Phase Application in the United States of International Patent Application PCT/EP2012/058007 filed May 2, 2012, which claims priority on European Patent Application No. 11005805.4 of Jul. 15, 2011. The entire disclosures of the above patent applications are hereby incorporated by reference.

The present invention concerns a light guide for lighting an information display device. More specifically, the present invention concerns a light guide for lighting from behind or back-lighting a liquid crystal display device.

A known technique for back lighting a transmissive display device consists in arranging a transparent light guide, inside which light is injected, below the display device. The light guide is structured to allow gradual extraction of the propagating light towards the display device. The structures provided in the light guide for extracting the light are called "light extractors". The number, geometry and distribution of these extractors inside the light guide vary in accordance with the application thereof.

It is an arduous task to select a given type of light extractor which can provide a good level of illumination without adversely affecting the display contrast of the data provided by the display device. Indeed, especially for aesthetic reasons which are easily understood, these light extractors must, in particular, be as invisible as possible to the user's view and able to ensure the most uniform possible lighting over the entire surface of the display device. This latter condition is especially important for the lighting of a display device that is integrated in a wristwatch.

A light guide of the type briefly described above includes at least one area into which the light produced by a light source is injected. The light sources used in this type of application are most often point light sources such as light emitting diodes or "LEDs". These light sources have high optical injection power into the light guide. Halos of light therefore appear around these light sources which can be seen through the information display device and which detract from the aesthetic appearance of the object, such as a wristwatch, in which the display device is integrated.

To overcome this problem, one solution that can be envisaged is to cover the area or areas of the light guide into which light is injected with a layer of light absorbing material. Consequently, the halos of light are concealed from and become invisible to the user's view.

The Applicant has engaged in trials of this type but, however, encountered another difficulty. Indeed, in the construction envisaged by the Applicant, the light guide is not only used to light an information display device, but also serves as a guide element for an electrical connector for the electrical connection between the display electrodes of the information display device and the electronic control components of the display device. It was found that, with this type of arrangement, the use of an electrically conductive absorbent material was prohibitive. Indeed, the electrically conductive absorbent material creates short-circuits upon contact with the electrical connector.

Since it is practically impossible, or at least economically unrealistic, to deposit the layer of absorbent material with such precision that it does not come into contact with the electrical connector, another category of absorbent material had to be chosen.

It is an object of the present invention to meet this requirement, in addition to others, by providing a light guide used both as a lighting system for a display device and also as a guide element for an electrical connector in which the halos generated by the light sources which inject light into the guide are concealed from the user's view.

The invention therefore concerns a lighting system for an information display device, said lighting system comprising a light guide including at least one area into which there is injected the light produced by a light source, said light guide also being used as a guide element for at least one electrical connector for the electrical connection between the information display device and an electronic control circuit of the information display device, said lighting system being characterized in that in proximity to the light injection area, the light guide has a rectilinear slot into which the electrical connector is guided, the light guide being coated, in the light injection area, with a layer of electrically non-conductive material which absorbs light.

As a result of these features, the present invention provides a lighting system wherein the light guide is coated, in the light injection areas, with a layer of electrically non-conductive material which absorbs light. The halos of light produced by the light sources are thus efficiently concealed from the user's view and, because the light absorbing material is non-conductive, it can be applied without excessive precision since any concerns as to electrical short circuits are avoided.

Other features and advantages of the present invention will appear more clearly from the following detailed description of an embodiment of the lighting system according to the invention, this example being given solely by way of non-limiting illustration with reference to the annexed drawing, in which.

The present invention proceeds from the general inventive idea consisting in covering the areas of the light guide in which the light sources inject light with a layer of light absorbing material in order to conceal from the user's view the light halos produced by the light sources. The light absorbing material also has the peculiarity of not being electrically conductive. This material can thus be applied without any excessive precautions where the light guide is used both for lighting an information display device and as a guide element for at least one electrical connector for the electrical connection between the information display device and an electronic control circuit of the information display device.

Figure 1:
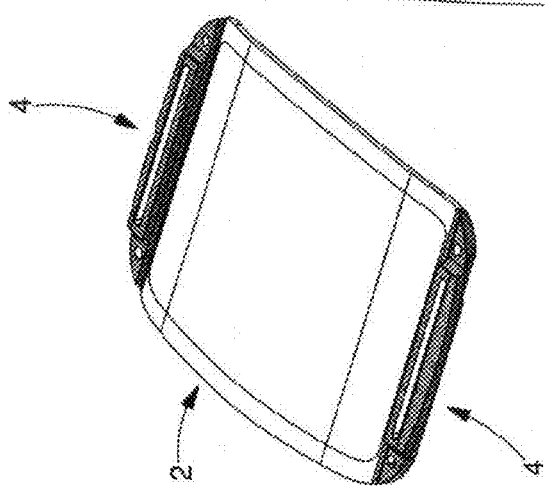
FIG. 1 is a perspective view of the light guide according to the invention.

Designated as a whole by the general reference number 1, the lighting system of the invention essentially includes a light guide 2 shown in perspective in FIG. 1. As revealed by an examination of FIG. 1, light guide 2 is of substantially parallelepiped shape and has small sides 4 which are arranged at midday and six o'clock and covered with a layer of electrically non-conductive light absorbing material.

Figure 2:
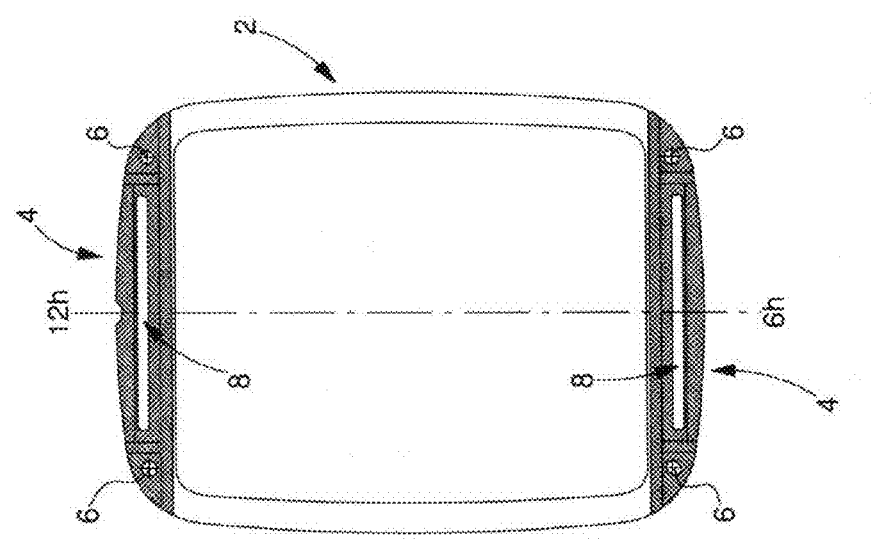
FIG. 2 is a top view of the light guide of FIG. 1.

As seen more clearly in FIG. 2 which is a top view of light guide 2, there are four holes 6 provided at the four corners of light guide 2. These four holes 6 are intended to receive four studs (not shown in the drawing) which are integral with the bottom of the watch case fitted with light guide 2 of the invention. The four studs are heat welded to immobilise light guide 2. On the small sides 4 of light guide 2 there are two rectilinear slots 8 for the vertical guiding of two electrical connectors 10, as will be seen in detail below with reference to FIG. 5. The areas of light guide 2 containing holes 6 and rectilinear slots 8 are, according to the invention, coated with a layer of electrically non-conductive material whose function is to absorb light in order to conceal from the user's view the halos of light produced by the light sources which inject light into guide 2. To highlight this feature visually, these areas are shaded in FIG. 2.

Figure 3:
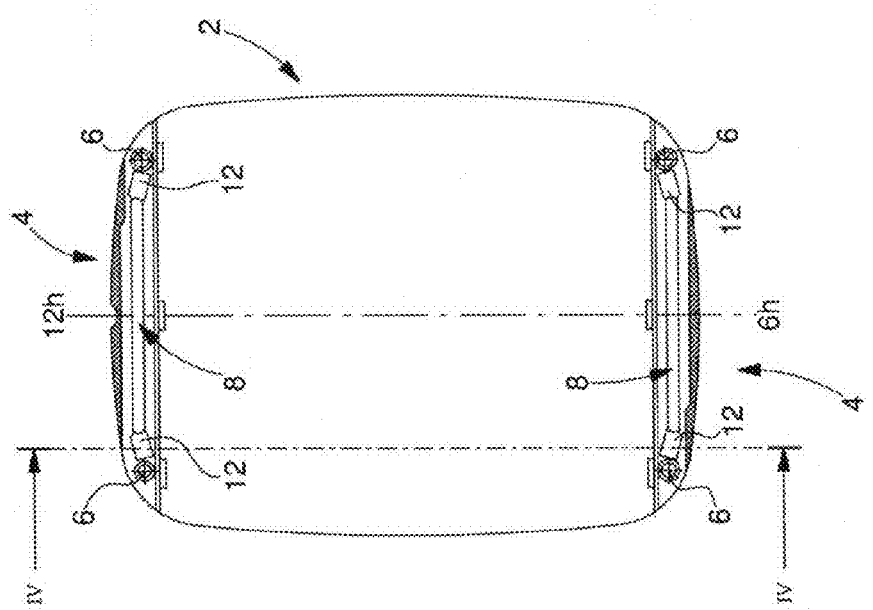
FIG. 3 is a bottom view of the light guide of FIG. 1.

FIG. 3, which is a bottom view of light guide 2, shows four housings 12 of substantially rectangular shape arranged symmetrically relative to the 12 o+clock-6 o'clock axis. These four housings 12, arranged in proximity to the ends of rectilinear slots 8, are each intended to receive a point light source 14, preferably a light emitting diode or "LED". These light sources 14 are used to inject into light guide 2 a luminous flux which will be extracted in a uniform manner from light guide 2 by a plurality of optical extractors (not shown). The function of these optical extractors is to extract the luminous flux from light guide 2 and to direct it towards an information display device 16 to be illuminated. As will be seen below, in the case of the present invention, the information display device 16 is disposed above light guide 2, i.e. on the same side as the user. Information display device 16 is thus usually said to be "backlit". However, the present invention is also applicable to the case where information display device 16 is disposed underneath light guide 2, i.e. on the opposite side to the user. It will also be noted that, although the present invention is described with reference to an example wherein four point light sources 14 are used, it goes without saying that this example is given purely by way of illustration and that the number of point light sources may vary and can be comprised between at least one source and a number determined by the geometry of the light guide.

Figure 4:
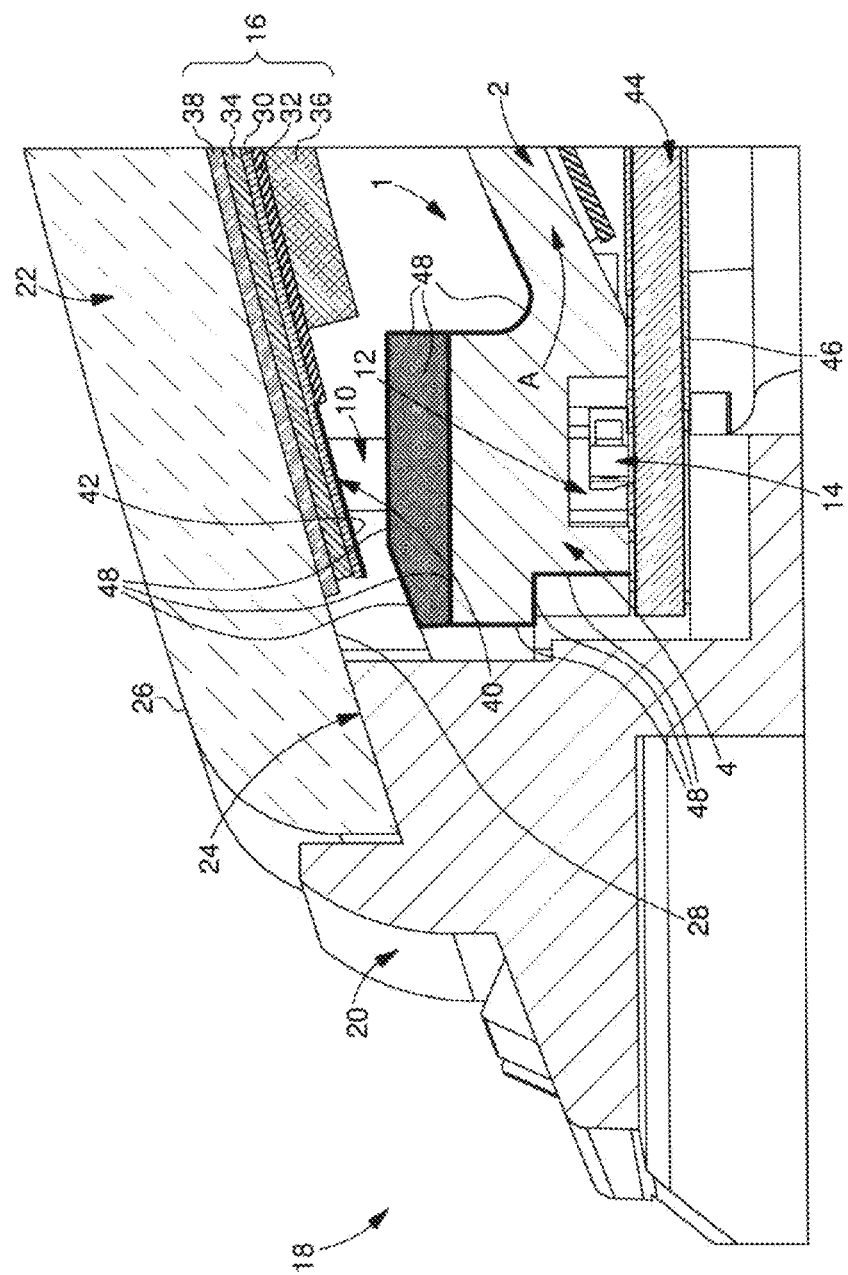
FIG. 4 is a cross-section along a direction parallel to the 12 o'clock-6 o'clock axis of the light guide of the invention in the area housing one of the light sources which injects light into the light guide.

FIG. 4 is a cross-section, along direction IV-IV of FIG. 3, of light guide 2 of the invention in the area housing one of light sources 14 which injects light into light guide 2.

More specifically, FIG. 4 illustrates the case where light guide 2 is integrated into a watch case 18. As shown in the drawing, watch case 18 is delimited by a middle part 20 and a watch crystal 22. Watch crystal 22 abuts on a shoulder 24 of middle part 20.

Watch crystal 22 has two surfaces, namely a top surface 26 facing the watch user side and a bottom surface 28 facing the watch case 18 side. An information display device is fixed to the bottom surface 28 of watch crystal 22. Purely by way of non-limiting example, this digital display device may be a liquid crystal display cell 16 comprising a front substrate 30 and a rear substrate 32 extending parallel to and at a distance from each other and joined to each other by a sealing frame (not shown in the drawing) which delimits a sealed volume for confining the liquid crystal. The two front 30 and rear 32 substrates are arranged between first and second polarisers, respectively 34 and 36, with intersecting directions of polarisation. The assembly formed by the two substrates 30 and 32 and the two polarisers 34 and 36 is bonded by means of a film of optical adhesive 38 to the bottom surface 28 of watch crystal 22.

It can be seen upon examining FIG. 4 that the dimensions of front substrate 30 exceed those of rear substrate 32. This forms a contact surface 40, onto which the conductive paths 42 open out for the electrical connection of the control electrodes of display cell 16 to the electronic control components (not shown) of cell 16. These electronic control components are mounted on a printed circuit board 44 arranged inside watch case 18, underneath display cell 16 and at a distance therefrom. According to the invention, the conductive paths 42 for the electrical connection of the control electrodes of liquid crystal display cell 16 are connected to corresponding conductive paths 46 structured on the surface of printed circuit board 44 by means of an electrical connector 10 which extends substantially vertically (see more particularly FIG. 5). By way of example, electrical connector 10 is an elastomer connector. It will be recalled that an elastomer connector, also known by the commercial name of a zebra connector, is a flexible connector formed of a plurality of conductive sheets separated from each other by elastomer insulating sheets.

The assembly is completed by light guide 2 which abuts on printed circuit board 44 and which is used to back light liquid crystal display cell 16. Thus, a light emitting diode 14 mounted on printed circuit board 44 is disposed in one of housings 12 provided for this purpose in the small side 4 of light guide 2.

To prevent halo phenomena at the place where LED 14 is located, the entire external surface 48 of small side 4 of light guide 2 is coated with a light absorbing material. The presence of this layer of absorbent material is illustrated in FIG. 4 by means of a thickened black line. It is therefore clear that the entire portion of light guide 2 located above LED 14 is opaque and thus conceals the halo of light produced by LED 14 from the user's view. The light consequently diffuses laterally in light guide 2 along arrow A in FIG. 4.

Figure 5:
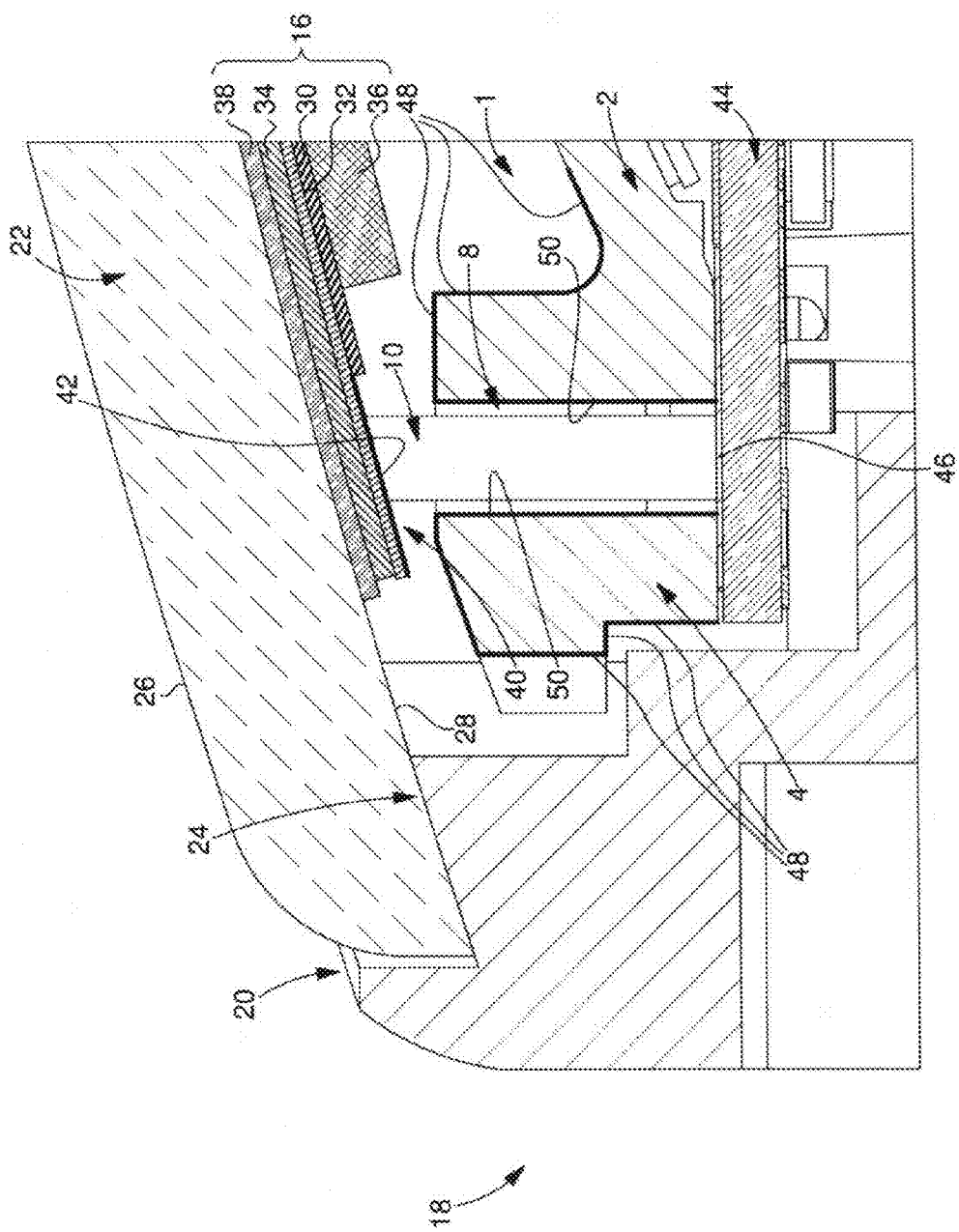
FIG. 5 is a cross-section along the 12 o'clock-6 o'clock direction of the light guide of the invention in the area where the light guide also serves as a guide element for an electrical connector for the electrical connection between an information display device and an electronic control circuit of the information display device.

FIG. 5 is a cross-section along the 12 o'clock-6 o'clock direction of light guide 1 of the invention in the area where light guide 2 also serves as a guide element for electrical connector 10 for the electrical connection between information display device 16 and printed circuit board 44, on which the electronic control components of information display device 16 are mounted. As revealed by an examination of FIG. 5, electrical connector 10 is vertically guided in rectilinear slot 8 provided in small side 4 of light guide 2. According to a crucial advantage of the invention, the inner surface 50 of rectilinear slot 8 is coated with the layer of absorbent material to prevent light leakage. Since the layer of absorbent material is electrically non-conductive, there is no risk of an electrical short circuit with electrical connector 10.

By way of example, the electrically non-conductive material may be obtained by a mixture of a basic black colour ABS QS110315-1 and a thinner ABS QS01 sold by Kunshan Quansheng Paint Co. Ltd.

It goes without saying that this invention is not limited to the embodiments that have just been described and that various simple alterations and variants can be envisaged by those skilled in the art without departing from the scope of the claims annexed to this Patent Application. In particular, because the light absorbing material is electrically non-conductive, it is possible to use electrical conductors whose lateral surfaces are not insulated, which is advantageous from an economic point of view.

The invention claimed is:

1. A lighting system for an information display device, wherein the lighting system comprises:
   a light guide including at least one area into which the light produced by a light source is injected,
   wherein the light guide also is used as a guide element for at least one electrical connector for electrical connection between the information display device and an electronic control circuit of the information display device,
wherein, in proximity to the light injection area, the light guide is coated with a layer of electrically non-conductive light absorbing material,
wherein the light guide includes a rectilinear slot into which the electrical connector is guided, and
wherein an inner surface of the rectilinear slot is coated with the layer of non-conductive light absorbing material.

* * * * *